United States Patent
Price

(10) Patent No.: US 11,955,801 B2
(45) Date of Patent: Apr. 9, 2024

(54) TECHNOLOGIES FOR TEMPORARY ISLANDING OPERATIONS OF ELECTRIC GRID SECTIONS

(71) Applicant: OnGrid Options, LLC, McLean, VA (US)

(72) Inventor: Jeffrey P. Price, McLean, VA (US)

(73) Assignee: Ongrid Options, LLC, McLean, VA (US)

( * ) Notice: Subject to any disclaimer, the term of this patent is extended or adjusted under 35 U.S.C. 154(b) by 990 days.

(21) Appl. No.: 16/681,963

(22) Filed: Nov. 13, 2019

(65) Prior Publication Data

US 2020/0153250 A1 May 14, 2020

Related U.S. Application Data

(60) Provisional application No. 62/767,499, filed on Nov. 14, 2018.

(51) Int. Cl.
*H02J 3/38* (2006.01)
*G01R 19/25* (2006.01)
(Continued)

(52) U.S. Cl.
CPC .......... *H02J 3/388* (2020.01); *G01R 19/2513* (2013.01); *G05B 19/0428* (2013.01);
(Continued)

(58) Field of Classification Search
CPC .. H02J 3/388; G01R 19/2513; G05B 19/0428
See application file for complete search history.

(56) References Cited

U.S. PATENT DOCUMENTS 8,138,626 B2 * 3/2012 Jonsson ............ H02J 13/00002
307/38
9,660,451 B1 * 5/2017 Naiknaware ............. H02J 3/38
(Continued)

OTHER PUBLICATIONS

Loudiyi, Khalid, et al. "Grid code status for wind farms interconnection in Northern Africa and Spain: Descriptions and recommendations for Northern Africa." Renewable and Sustainable Energy Reviews 81 (2018): 2584-2598. (Year: 2018).*
(Continued)

*Primary Examiner* — Darrin D Dunn
*Assistant Examiner* — Vi N Tran
(74) *Attorney, Agent, or Firm* — Dentons US LLP

(57) ABSTRACT

An electric grid comprising a first section comprising transmission equipment, power generation equipment, and electric transmission lines designed to serve an electric load within the first section independently of a second section, wherein the second section comprises the remaining electric grid excluding the first section. The system includes at least two electric connections between the first and second sections of the electric grid and a control system controlling operation of the first section independently of the second section. The first section comprises at least two of power generation, electricity storage, demand response, transmission equipment and electric loads within the first section and controls capable of balancing loads within the first section and controlling disconnection and reconnection with the second section via the electric connections. The first section synchronized in frequency and phase with the electric grid when power is restored to the electric grid.

38 Claims, 6 Drawing Sheets

(51) Int. Cl.
  *G05B 19/042* (2006.01)
  *G06F 21/57* (2013.01)
  *G06Q 50/06* (2012.01)
  *H02J 13/00* (2006.01)

(52) U.S. Cl.
  CPC ............ *G06F 21/57* (2013.01); *G06Q 50/06* (2013.01); *H02J 3/381* (2013.01); *H02J 13/00002* (2020.01); *H02J 13/00006* (2020.01); *G05B 2219/24015* (2013.01); *G06F 2221/034* (2013.01)

(56) References Cited

U.S. PATENT DOCUMENTS

| | | | | |
|---|---|---|---|---|
| 10,599,175 | B1* | 3/2020 | Wells | H02J 3/381 |
| 2004/0008010 | A1 | 1/2004 | Ebrahim | |
| 2012/0029897 | A1* | 2/2012 | Cherian | H02J 13/00028 |
| | | | | 703/18 |
| 2012/0283888 | A1 | 11/2012 | Mao | |
| 2013/0069437 | A1* | 3/2013 | Biallas | H02J 4/00 |
| | | | | 307/80 |
| 2014/0001847 | A1* | 1/2014 | Khandelwal | H02J 13/00004 |
| | | | | 307/11 |
| 2014/0107852 | A1 | 4/2014 | Horsfield | |
| 2014/0246925 | A1* | 9/2014 | Porter | H02J 3/14 |
| | | | | 307/115 |
| 2015/0295581 | A1 | 10/2015 | Shi | |
| 2016/0241032 | A1* | 8/2016 | Zimmanck | H02J 3/14 |
| 2016/0313716 | A1* | 10/2016 | Chen | H02J 4/00 |
| 2017/0018932 | A1* | 1/2017 | Pahlevaninezhad | H02M 7/48 |
| 2017/0063918 | A1* | 3/2017 | Mohan | G05B 19/41855 |
| 2017/0179720 | A1 | 6/2017 | Porter | |
| 2018/0152022 | A1* | 5/2018 | Manson | H02J 3/381 |
| 2019/0148941 | A1* | 5/2019 | Wang | H02J 3/381 |
| | | | | 700/287 |
| 2020/0244070 | A1* | 7/2020 | Sørensen | F03D 7/048 |

OTHER PUBLICATIONS

International Search Report and Written Opinion dated Mar. 20, 2020 in related PCT Application PCT/US19/61101 filed Nov. 13, 2019 (14 pages).

Europe Supplementary Search Report dated Nov. 7, 2022 in related EP Application 19883547.2 filed Nov. 13, 2019 (15 pages),.

\* cited by examiner

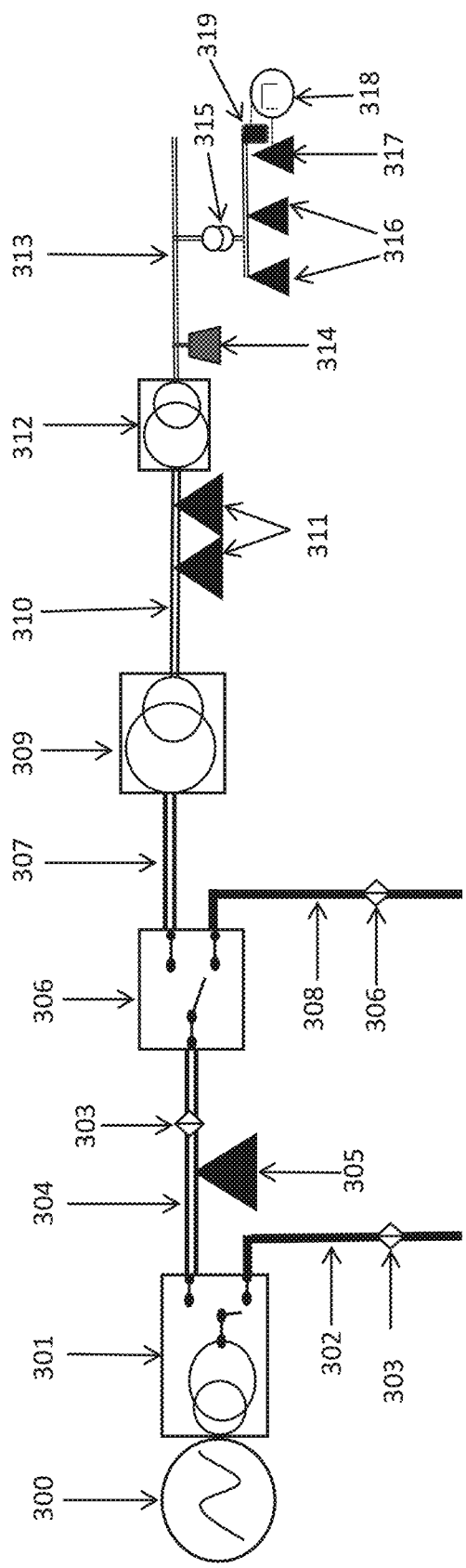

TECHNOLOGIES FOR TEMPORARY ISLANDING OPERATIONS OF ELECTRIC GRID SECTIONS

CROSS REFERENCE TO RELATED APPLICATIONS

The present application claims the benefit of U.S. Provisional Application Ser. No. 62/767,499 filed 14 Nov. 2018, which is incorporated herein by reference in its entirety.

TECHNICAL FIELD

This disclosure relates to technologies for temporarily operating a first section of an electric grid (e.g. transmission, distribution) independent of a second section of the electric grid when the electric grid, as a whole, experiences an outage.

BACKGROUND

Concerns about electric resilience are increasing. Outages with severe, large-scale and extended impacts have occurred in the United States, Canada, Europe, and elsewhere. Such outages can be caused by grid stability problems, extreme natural conditions (e.g. weather, wild-fires, geomagnetic disturbances, earthquakes, floods, storms) and by man-made disruptions (e.g. vandalism, equipment failure, computer hacking). Other types of threats (e.g. electromagnetic pulse, solar flares) are also possible and could result in even more widespread and extended outages. Some of these threats can cause an outage over wide areas of the electric grid. Cascading failures are another failure mechanism that may occur as a result of these threats or simply a result of faults that occur in the electric system itself. Cascading failures occur in electric power grids when one component fails and shifts its loads to nearby components in the system which then, pushed beyond their capabilities, also fail, starting a chain-reaction of failures.

Electric utilities, electric consumers, and government regulators are seeking to increase resilience to the various threats faced by the electric system. Current methods of improving resilience (e.g. grid hardening, recovery plans, collaboration among utilities, implementation of recovery plans, microgrids) are helpful, but each has limitations. These methods are often expensive, cover only limited infrastructure and some threats, and each may provide only one method of dealing with that threat. Yet, the cost of protecting everything on the electric grid all of the time from every threat is cost-prohibitive. Therefore, an affordable new approach is needed. That new approach should enable priority critical infrastructure facilities to continue to operate during large-scale, long-term outages, while enabling a rapid recovery of the broader power grid.

SUMMARY

In one or more embodiments, the present disclosure provides for a method for detecting or anticipating a problem in an electric grid, wherein the electric grid comprises at least two sections, wherein the first section is connected to the electric grid via at least two electric connections, and comprises transmission equipment and power generation equipment designed to serve at least one electric load within the first section independently of a second section of the electric grid, wherein the second section comprises the remainder of the electric grid but excluding the first section; disconnecting the first section from the electric grid via the at least two electric connections when the problem is detected or anticipated; controlling an operation of the first section after disconnection by balancing power generated within the first section with the at least one electric load within the first section; transmission of power to the at least one electric load within the first section; monitoring at least two of the generation, transmission, storage or consumption of electricity within the first section during the period of disconnection; and restoring control of the first section to the electric grid when the problem is resolved or no longer anticipated In certain embodiments, the method further comprises coordinating one or more of outage detection, disconnection, operation, monitoring, and restoration with the operation of a broader electric interconnection.

In certain embodiments, the method further comprises providing black start capabilities by reenergizing a broader regional electric transmission and distribution system outside of the first section; and providing motive power to power generation facilities outside of the first section.

In certain embodiments, the method further comprises controlling demand response by various electric loads within the first section.

In certain embodiments, the method further comprises enabling only selected loads to be provided with electricity within the first section.

In certain embodiments, the method further comprises controlling electricity storage within the first section as part of a balancing of electric generation and loads.

In certain embodiments, the first section is operated in coordination with the operation of the rest of the electric interconnection when the electric interconnection is operating normally.

In certain embodiments, the method further comprises transmission and distribution of power to a plurality of loads within the first section.

In certain embodiments, the method further comprises monitoring the transmission and distribution of electricity within the first section during the period of disconnection.

In certain embodiments, the problem comprises at least one of a widespread outage, a grid stability problem, a cascading failure, extreme natural conditions, or man-made disruptions, or any combination thereof, in or to the electric grid.

In certain embodiments, the disconnecting is implemented when the widespread outage, grid stability problem, cascading failure, extreme natural conditions, or man-made disruptions, or any combination thereof, is detected or anticipated.

In certain embodiments, the electric operation is restored to the electric grid when decided by an operator. In certain embodiments, the operator is an automated computer system or a computerized control system. In certain embodiments, the control of the operation of the first section is accomplished via at least one of a centralized or distributed control system.

In certain embodiments, the method further comprises sensors, wherein a distribution of electricity within the first section during a period of disconnection is monitored via the sensors.

In certain embodiments, the method is used to control distribution circuits within the first section, including distributed generation, distributed storage and electric loads served by those distribution circuits.

In certain embodiments, the method further comprises controlling and operating further selected transmission lines connected to transmission lines already operated by the first section and selected power generation and storage and electric load equipment on those selected transmission lines, including those power generation and storage and electric load equipment on distribution circuits connected to the further selected transmission lines.

In certain embodiments, the substations and transmission or distribution lines that remain in operation during an outage within or connected to the first section are selected using adaptive islanding methods.

In certain embodiments, some or all of distributed resources that are controlled by the first section are used as a virtual power plant and/or to implement a transactive energy system of economic and control mechanisms either within the first section alone or as part of a broader transactive energy market including the first section.

In one or more embodiments, the present disclosure provides for a system comprising: an electric grid comprising a first section and a second section, wherein the first section comprises transmission equipment, power generation equipment, and electric transmission lines, wherein the transmission equipment, power generation equipment, and electric transmission lines are designed to serve at least one electric load within the first section independently of the second section, wherein the second section comprises a remainder of the electric grid but excluding the first section; at least two electric connections between the electric grid and the first section, wherein each of the two electric connections contains switching equipment that is configured to isolate the first section from the second section; a centralized or distributed control system comprising one or more processors that implements instructions stored in a memory to control operation of the first section independently of the second section, wherein the control comprises at least two of power generation, electricity storage, demand response, transmission within the first section, power flow, voltage and frequency control, VAR control, switching, and disconnecting and reconnecting with the electric grid via the at least two electric connections, and synchronize the first section in frequency and phase with the electric grid via at least one of the at least two electric connections when power is restored to the electric grid; measurement equipment coupled to the control system, wherein the measurement equipment monitors and reports to the control system the status and operations of at least one of the at least one electric load, power generation, electricity storage, or the electric transmission network within the first section; and a plurality of transceivers or other communications devices connecting the control system to the measurement equipment.

In certain embodiments, the system further includes equipment for internal switching to direct electric current to specific priority electric loads and limit electricity delivered to specific facilities.

In certain embodiments, the system further includes equipment and software to provide cybersecurity.

In certain embodiments, the system further includes equipment to provide protection from severe weather events, physical attacks, cyberattacks, geomagnetic disturbances, electromagnetic pulse events, and combinations of these or other threats.

In certain embodiments, the system further includes electric storage devices, whether centralized or distributed located within the first section.

In certain embodiments, the system further includes emergency generators located within the first section and measurement and communications equipment to enable coordination with the operations of the first section.

In certain embodiments, the system further includes fuel storage facilities for the electric generators within the first section.

In certain embodiments, the system further includes one or more microgrids located within the first section and measurement and communications equipment to enable coordination with the operations of the first section.

In certain embodiments, the system further includes a communications system comprising a part of a communications system used for control of the electric interconnection, but that is independently operable.

In certain embodiments, the system further includes a communications system that serves purposes other than control of the system.

In certain embodiments, the system further comprises distribution lines, wherein power to a plurality of loads within the first section are distributed via the distribution lines.

In certain embodiments, electric circuits within the first section are controlled as a software defined network.

These and further features and embodiments are described in the detailed description below.

BRIEF DESCRIPTION OF THE DRAWINGS

The set of accompanying illustrative drawings show various examples embodiments of this disclosure. Such drawings are not to be construed as necessarily limiting this disclosure. Like numbers and/or similar numbering schemes can refer to like and/or similar elements throughout.

FIG. 8 shows an exemplary embodiment of an enclave that comprises a single transmission line and a single distribution line.

DETAILED DESCRIPTION

Figure 1:
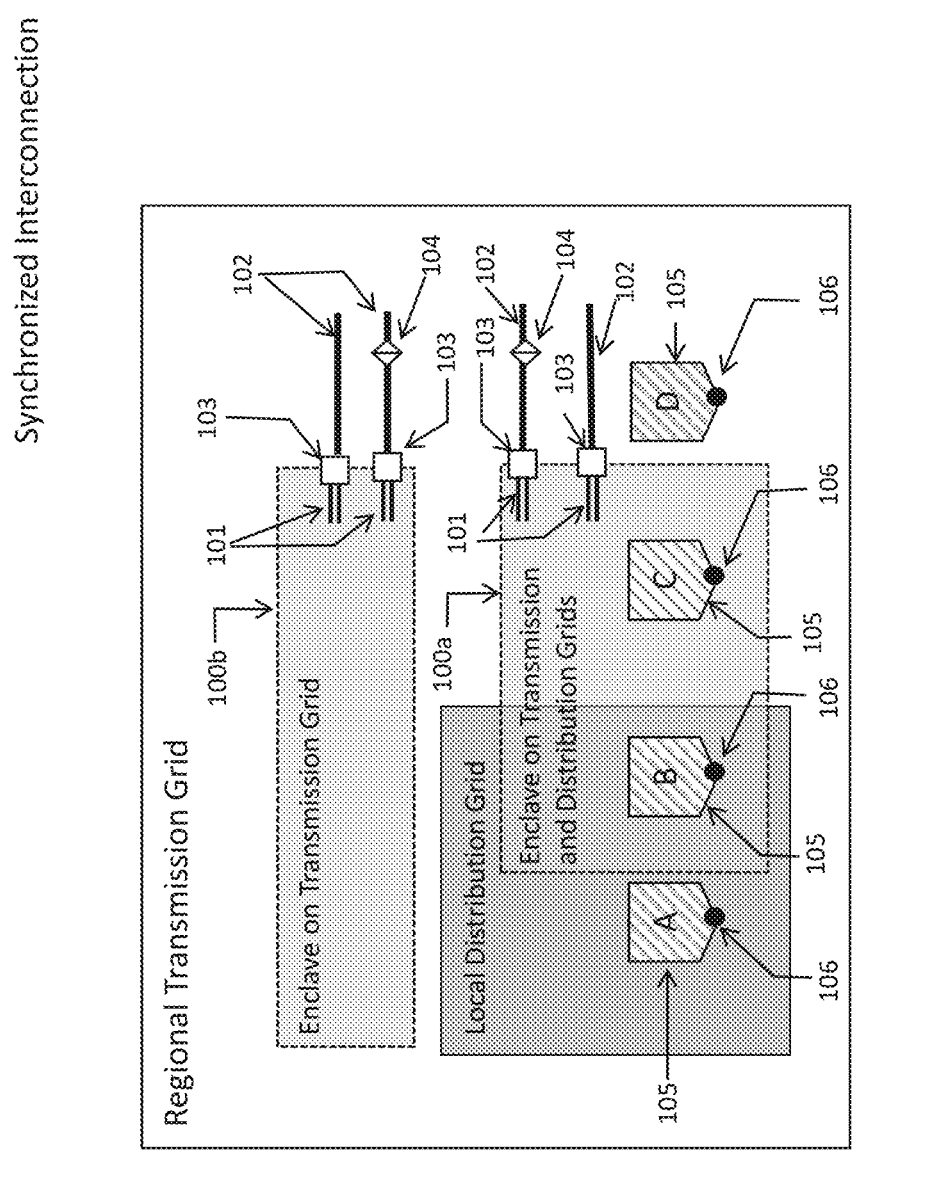
FIG. 1 shows an exemplary embodiment that illustrates the relationships of enclaves to other electric grid constructs.

Secure power enclaves ("enclaves") can enable a section of the electric transmission and distribution (T&D) grid to continue to serve critical infrastructure even during extended, widespread outages affecting the broader electric T&D grid. One of such enclaves can include a type of secure electric power system that would temporarily operate in a limited section of a larger T&D grid during emergency outage conditions. Enclaves may also further assist in the recovery of the broader electric system by providing black start services. Black start includes restoring an electric power station or a part of an electric grid to operation to recover from a total or partial shutdown. Black start involves systematically re-energizing electric circuits that are not operating and restarting and resynchronizing electric generators by providing cranking power to rotating machinery such as turbines.

To best explain what an enclave is and how it operates, several constructs of the electric T&D grid are initially explained. These constructs include electric interconnections, electric transmission, balancing authorities, electric distribution, demand response, distributed energy resources, microgrids, and electric islanding.

An interconnection includes an electrical grid at a regional scale or greater that operates at a synchronized frequency and is electrically tied together during normal system conditions. In the United States and Canada, for example, electricity is delivered to consumers either through an electric interconnection (e.g., Eastern Interconnection, Western Interconnections, Electric Reliability Council of Texas (ERCOT), Quebec Interconnection, Alaska Interconnection) or through island electric utilities (e.g., Hawaii, Puerto Rico) or through microgrids for isolated communities or other facilities.

Electric transmission includes movement over the Bulk Power System (BPS) using high voltage electric transmission lines, generally above 69 kilovolts (kV), of electrical energy from a generation site (e.g., power plant) to an electrical substation that reduces the voltage for electric distribution. The BPS can include facilities and control systems necessary for operating an interconnected electric energy transmission network and electric energy from generating facilities needed to maintain transmission system reliability.

The entities that operate and regulate the electricity transmission and distribution vary by country, as does the structure of electricity markets. In the continental United States and Canada, for example, the transmission systems of electric interconnections are operated in whole or in part by Independent System Operators (ISOs), Regional Transmission Operators (RTOs), or by electric utilities. In the continental United States excluding ERCOT, electricity transmission and wholesale electric markets are federally regulated. ISOs and RTOs also operate competitive and federally regulated wholesale electric markets over the BPS. Three Canadian provinces, Alberta, New Brunswick, and Ontario have independent system operators. The transmission of electricity must be coordinated with those markets. In the European Union, Transmission System Operators (TSOs) operate electricity transmission while Distribution System Operators (DSOs) operate electric distribution systems and entities known as Balance Responsible Parties (BRPs) are responsible for balancing supply and demand of electricity. Other countries have different industry and market structures. In many countries, for example, electric utilities are government-owned and perform all electric power industry functions. The structure of the electricity industry is also changing in many countries, and much of that change is driven by evolving electric generation, grid, and end-use technologies and by policy goals such as reducing emissions, increasing renewable generation, and empowering electric consumers.

Balancing authorities in North America perform several functions within interconnections. These functions include electric generation dispatch, balancing electric loads with central station generation and electricity storage, interchange of power with neighboring balancing authorities, and frequency control. Central station resources are electric generation or storage facilities, often very large, connected through the electric transmission network. Frequency control involves maintaining the required frequency of the electric system (50 or 60 Hertz depending on the country). Various methods are available to electric system operators to achieve frequency control.

Both the Eastern and Western Interconnections in North America have multiple balancing authorities. ERCOT and Quebec each have only one. Balancing authorities are ISOs or RTOs in areas where those types of organizations operate. In other areas, balancing authorities are electric utilities. During the time it operates, an enclave can operate as a balancing authority for the section of the electric and distribution grid that it operates until power and control is restored to the broader electric grid.

Electric distribution includes movement of electricity from substations to electric consumers at lower voltages than electric transmission. Electric distribution further reduces the voltage for consumers (e.g., 220 to 240 volts and/or 110 to 127 volts depending on the country). Control of electric distribution traditionally involved flow control through switching devices, volt and Volt-Ampere Reactive (VAR) control, and demand response. Voltage control involves maintaining voltage in the various circuits of the T&D system at the levels required for their safe and reliable operation. VAR includes a measure of how reactive power is expressed in alternating current electric systems. Reactive power occurs in alternating current systems when the voltage and current are out of phase.

Demand response includes changes in electric usage by end-use customers from their normal consumption patterns. This may be in response to changes in the price of electricity over time, to incentive payments, or to direct control by an electric power industry entity. Demand response is designed to induce lower electricity use at times of high wholesale market prices or when system reliability is jeopardized.

Distributed Energy Resources (DER) are small-scale electric resources usually connected through the distribution grid. They include renewable resources (e.g., solar, wind) combined heat and power, rechargeable electric vehicles, electricity storage, and microgrids. Some of these DER are distributed generation resources that produce electricity and inject it into the electric grid. Electricity storage devices located at consumer premises absorb electricity which they later re-inject into the electricity grid. These DER electricity injections occur most often into the distribution systems at low voltages, and not directly into the transmission system.

The flow of electrons has historically been one-way from generating plants on the transmission network to loads on or at the end of distribution circuits. The advent of DER that inject electricity has meant that the flow of electrons into distribution systems may be two-way. This can lead to the need for more complex distribution controls. Electricity distribution and any retail electric markets in which consumers purchase and sometimes may sell power are regulated by state utility regulatory commissions in the United States.

A microgrid includes a group of interconnected loads and distributed energy resources within clearly-defined electrical boundaries that acts as a single controllable entity with respect to the grid. The microgrid can connect and disconnect from the grid to enable it to operate in both grid-connected and electric islanding mode. Microgrids may be operated either by utilities or electric consumers. Microgrids are usually connected to the external electric grid at a single bus called a point of common coupling.

Electric islanding occurs when electric generators continue to serve loads within a defined section of the electric T&D grid independently of the rest of the grid. Islanding may occur deliberately when the supply of electricity to those electric loads from the electric grid is cut off and the operators of a facility that can supply those loads disconnects that facility and those loads from the rest of the grid and continues to supply electricity. Enclaves, microgrids, and emergency generators can do this type of islanding. Adaptive islanding approaches have also been proposed wherein the section of the electric grid to be islanded is determined at the time of or in anticipation of a potential outage, possibly in real time, depending on electric grid conditions. What is to be islanded may not be known in advance. Some adaptive islanding approaches also only apply to the distribution grid.

Islanding may also occur unintentionally when distributed generation resources induce faults in electric lines that cause those lines to be disconnected from the grid. Unintentional electric islanding is usually seen as a problem by the electric power industry operators because unintentional electric islanding can present a danger to electric workers, can damage equipment, and interrupts electric service to many customers. Islanding by enclaves, microgrids, and emergency generators is done with appropriate safeguards for reconnection to the grid.

Various control and communications systems are used for electric T&D systems and the facilities and devices on these systems. Supervisory Control and Data Acquisition (SCADA) is one such system commonly used. SCADA uses computers, networked data communications, and graphical user interfaces for process supervisory management coupled with the use of other peripheral digital devices to interface the connected facilities and devices. Other types of systems may also be used, including Distributed Control Systems (DCS) and cloud-based control systems. Different control systems may be used for the transmission system, the distribution systems served by the transmission system (of which there may be a plurality), and the facilities and devices connected to the network. Increasing use of DER creates a growing need for interoperability and standards for that interoperability.

Communications and control systems for the T&D grid network operate over various wired and wireless communications systems (e.g., optical fiber, Ethernet cable, local and wide area networks, power lines, Internet, radio networks, cellular networks). Each type of control and communications system has its own vulnerabilities, perhaps none more so than the Internet which is especially subject to cybersecurity vulnerabilities. A growing cybersecurity concern is a rapidly-growing number of end-use devices, for example, at homes that may be connected to both the internet and DER control systems.

An enclave includes a local section of an electric T&D network containing both power generation and critical infrastructure facilities as well as possibly other selected facilities that can, when necessary, be "islanded" to operate independently of the rest of the T&D network. Enclaves provide a method of increasing the resilience from major threats to the electric loads most critical to community and national security and can serve as cost-effective hubs for renewable energy. Enclaves can often be a more effective and affordable way to ensure that critical services continue than either protecting the entire grid or separately enabling individual facilities to island through microgrids. Enclaves are not adaptive islanding in that the section of the electric T&D grid to be islanded is pre-planned and prepared ahead of time with both electric resources and loads to be served specified. While the infrastructure of the enclave is predetermined, however, the specific implementation of islanding including the resources that are used and the loads served may vary over time. To that extent, adaptive islanding techniques may be used within the enclave and to expand the enclave as the situation permits.

Enclaves include selected T&D assets and may include both central-station generation and distributed generation facilities, as well as other resources such as demand-response, energy storage, and microgrids. Enclaves can be implemented organizing existing electric transmission and distribution circuits and equipment in those circuits in a new way by adding, at a minimum at selected substations, circuits, and locations switching equipment, controls and measurement equipment with transceivers or other communications devices and control processors. Such measurement equipment, for example, could measure currents, voltages, phase angles, and frequencies. Enclaves use a control system to balance the resources within or served by the section of the T&D network with critical infrastructure serving community, first responder, and national interests. In addition, they could also assist in the restoration of the broader grid by providing black start capabilities.

An enclave with T&D, generation, and storage resources can operate as part of the broader regional power grid under normal conditions, but the enclave can operate as a secure island under independent control when the overall regional power grid is down. Depending on the design of the enclave, the electric wires that interconnect the components of the enclave may be part of the electric transmission system, the distribution system, or both.

One possible use of the DER within an enclave would be as a virtual power plant. A virtual power plant is a group of independent distributed energy resources, which may be some combination of generation, energy storage and demand response, that are aggregated and used in a coordinated manner to provide dispatchable resources to the electric grid and possibly participate in electricity markets.

An enclave could also be used as a physical platform for transactive energy. Although there are other definitions, transactive energy is defined by the US Department of Energy as "a system of economic and control mechanisms that allows the dynamic balance of supply and demand across the entire electrical infrastructure using value as a key operational parameter." A transactive energy system can be used as a way for consumers to participate in electricity markets within a secure power enclave or connected group of enclaves, including over the distribution system.

For both virtual power plant and transactive energy market participants and other electric generation (renewables and microgrids, for example) and storage assets, being within an enclave creates greater market stability and the ability to sell their output when they otherwise could not.

FIG. 1 shows a diagram of an embodiment that illustrates the relationships of enclaves to other electric grid constructs. The largest construct in the electric grid is the synchronized interconnection. Indeed, the Eastern Interconnection, which serves most of the United States east of the Rocky Mountains and parts of Canada, is sometimes called the "largest machine in the world." Within each synchronized interconnection are regional transmission grids operated by balancing authorities that may be ISOs, RTOs, electric utilities, or other entities designated by regulatory authorities to be synchronized in frequency and phase throughout the synchronized interconnection. Within each regional transmission grid are local distribution grids operated by electric utilities or DSOs. Multiple local distribution grids serve the entire geographic area of each regional electric grid.

Enclaves may be implemented either [100a] over the electric circuits of both the regional transmission grid and the local distribution grid or [100b] entirely on the circuits of the regional transmission grid [101] inside the enclave and [102] outside. In either implementation, the enclave is connected to the regional transmission grid's circuits at substations containing switching gear controllable by the operator of the enclave [103]. In certain embodiments, the operator of the enclave is at least one of an automated computer system, a computerized control system, a human controller, or any combination of the foregoing. This occurs at a multiplicity of substations, and some of these may also be on the electric circuits of the local distribution grid.

Microgrids [105] may be connected to either the regional transmission grid or to the local distribution grid either outside of or within an enclave, as is also illustrated in exemplary form in FIG. 1. Microgrid A is connected to the local distribution grid outside the enclave. Microgrid B is connected to the local distribution grid inside the enclave. Microgrid C is connected to the regional transmission grid inside the enclave. Microgrid D is connected to the regional transmission grid outside the enclave. Microgrids B and C are thus components of the enclave while microgrids A and D are not. Regardless of where a microgrid is connected to the grid, the microgrid is connected to the outside grid at a point of common coupling [106], which contains switches that permits the microgrid to electrically island and may be part of an electric substation.

Figure 2:
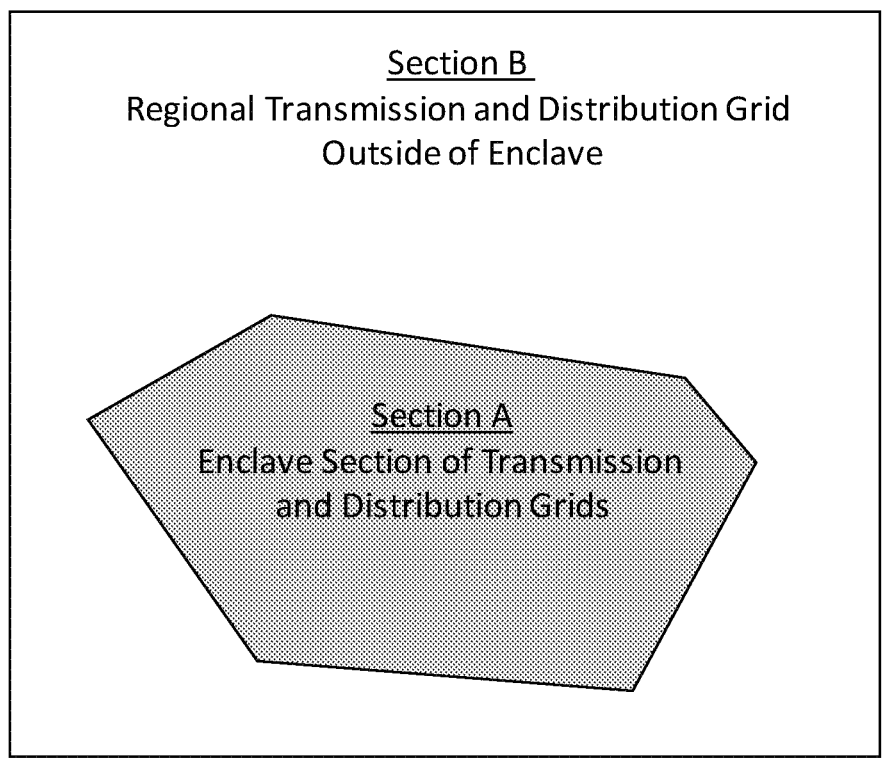
FIG. 2 shows an exemplary embodiment of a difference between two sections of a regional transmission and distribution grid.

FIG. 2 shows a diagram of an embodiment of a difference between two sections of the regional transmission and distribution grid. The electric circuits and equipment served by the enclave when the enclave islands constitute one section of the electric grid, as shown in the example of Section A in FIG. 2. The rest of the electric grid not served by the circuits of the enclave, whether transmission or distribution, constitutes a second section of the electric grid, as shown as Section B in FIG. 2.

Figure 3:
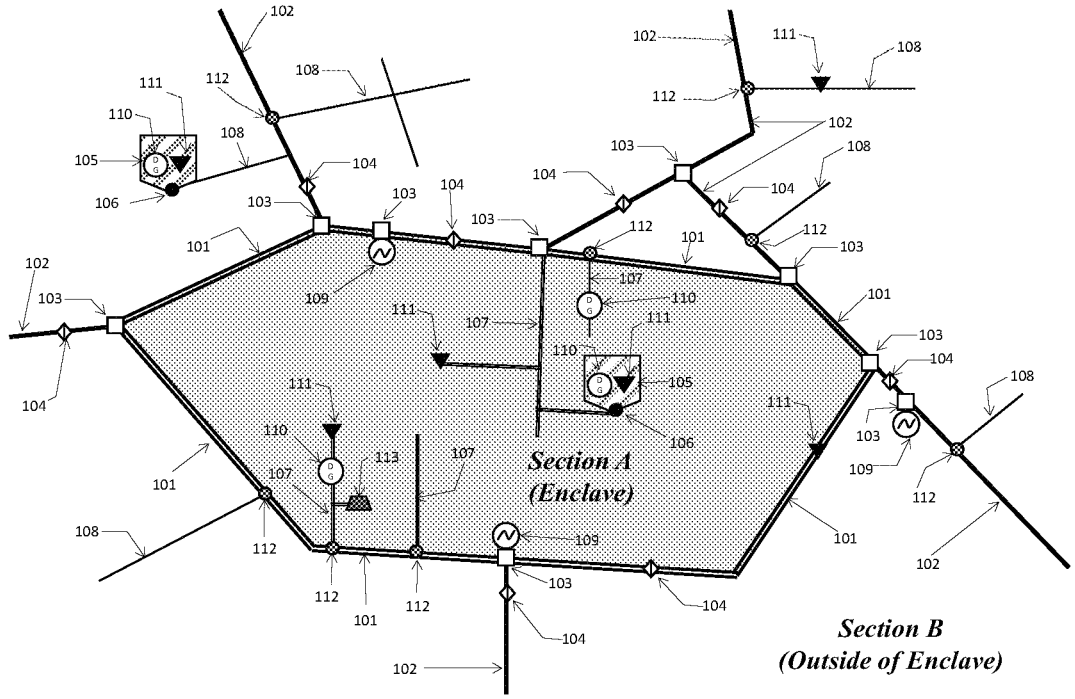
FIG. 3 shows an exemplary embodiment of major electric circuits in an area of a regional power grid with enclaves and microgrids, operating under normal conditions.

FIG. 3 shows a diagram of an exemplary embodiment of major electric circuits in an area of a regional power grid with enclaves and microgrids operating under normal conditions. An enclave contains various types of equipment as shown in the example of FIG. 3. This includes transmission lines [101] and transmission substations [103], some of which include switching equipment to disconnect Section B and communications capabilities, such as, for example, a transceiver. The enclave also includes distribution lines [107] and distribution substations [112]; measurement equipment with communication capabilities, such as, for example, a receiver or a transceiver [104] that monitor the operation of the T&D system both within and outside the enclave; microgrids [105]; control processors and communications system, such as, for example, a transmitter or a transceiver [113]; central station power plants and/or energy storage facilities [109]; electric loads to which it is deemed critical to maintain an electricity supply and usually meter to monitor those electric loads [111]; and possibly distributed generation and energy storage devices [110]. Some implementations may be executed entirely over the transmission system and not include distribution lines and substations or distributed resources. Others may not include central station power plants or storage resources. All of the communications systems and capabilities can be accomplished via a wired or wireless connection, optical fiber of any combination of the foregoing or any other communication technology or method currently in existence or developed in the future.

Central station power plants and energy storage facilities [109] may generate electrical power and may comprise any suitable source of electrical power (e.g., a hydroelectric, fossil fuel, nuclear, wind, solar, biomass, geothermal, or marine generator, power plant, or another power source now unknown or developed in the future). Distributed generation facilities may also include any of these sources of electric power. Energy storage facilities, whether central station or distributed generation, may comprise any suitable technology for energy storage, including pumped storage, hydroelectric, electrical and flow batteries using any one of many chemistries, compressed air energy storage, flywheel energy storage, super-capacitors, liquid air energy systems or any other type of energy storage method, now known or developed in the future. A single facility interconnected to the electric T&D grid, whether central station or a distributed resource, may combine both electric generation and energy storage.

Section A of the electric T&D grid, as is also shown in FIG. 3, is on transmission lines [102] and distribution lines [108] that could be disconnected from the rest of the electric T&D grid, that is, from Section B, in order to achieve islanding. Section B could also contain other Enclaves and one implementation could be for a multiplicity of Enclaves to be connected to each other.

Figure 4:
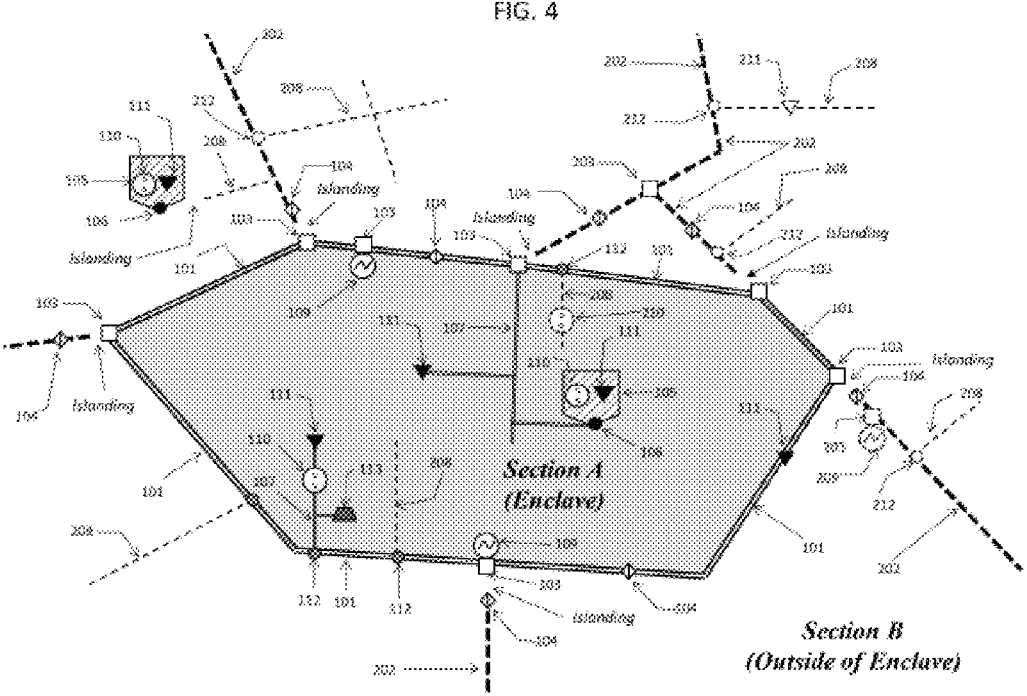
FIG. 4 shows an exemplary embodiment of the regional power grid of FIG. 3 with enclave and microgrids, during a regional outage.

FIG. 4 shows a diagram of an embodiment of the same exemplary regional power grid with enclave and microgrids during a regional outage. In particular, FIG. 4 shows what would happen if the enclave became islanded, as would happen during an outage. In FIG. 4, the facilities that would not be operating during an outage are shown using dashed lines and outlines. Facilities experiencing outages include transmission lines [202] and transmission substations [203]; distribution lines [208] and distribution substations [212]; central station power plants and electric storage facilities [209]; and distributed generation and storage facilities [210]. Enclaves may also contain loads on distribution lines that are not considered critical during an outage and the enclave operators may choose to disconnect those distribution lines [208] using controls at appropriate distribution substations [112]. Only those circuits and facilities within the enclave that the operator of the enclave chooses to serve can operate.

Microgrids [105] may also be located within enclaves and could thereby provide an added measure of reliability and resiliency to the enclave and the enclave could provide the same benefits to such microgrids.

Microgrids and enclaves can differ in various ways. For example, the internal components of a microgrid are not part of the electric T&D grid and avoid operating under control of electric T&D grid operators. Microgrids connect to the electric T&D grid, most often on the distribution system, at a single point of common coupling. Enclaves and their components, by contrast, are an integral part of the electric T&D grid and are controlled by grid operators under normal conditions. Enclaves interconnect with the rest of the grid (Section B) and island at a multiplicity of substations which may be on either the regional transmission grid or the local distribution grid. Further, an enclave can operate in coordination with and to reinforce the security of a portion of the T&D grid and may operate over a wide geographic area connected by transmission lines. Microgrids, while they may, from time to time, provide energy and black-start services to the T&D grid, are designed to serve their internal loads, which are typically an industrial facility such as a data center or process plant, or a few buildings in close proximity, for example, a college campus or part of a military base. Typically, all the components of a microgrid are under the ownership of a single entity. The source of electric generation in a microgrid is in very close proximity to its internal loads. Enclaves, by contrast, may contain generation sources and electric loads which are geographically distant from each other and under different ownership.

Figure 5:
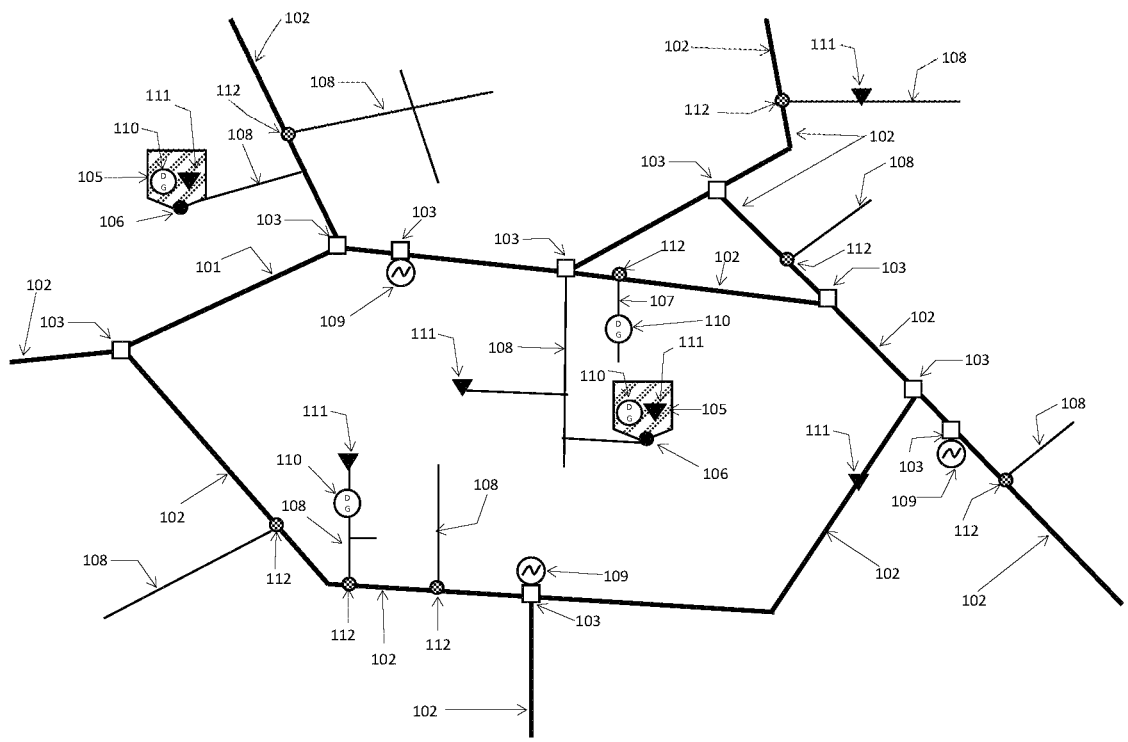
FIG. 5 shows an exemplary embodiment of the regional power grid of FIG. 3 with no enclave, operating under normal conditions.

FIG. 5 shows a diagram of an exemplary embodiment of the same electric circuits and equipment shown in FIG. 3 with no enclave in any part of those circuits. This is essentially the same as with an enclave, except that it has none of the measurement equipment [104], communications systems or the control processor and transceiver [113] and may not have the necessary switching equipment at some substations [103] that create the enclave.

Figure 6:
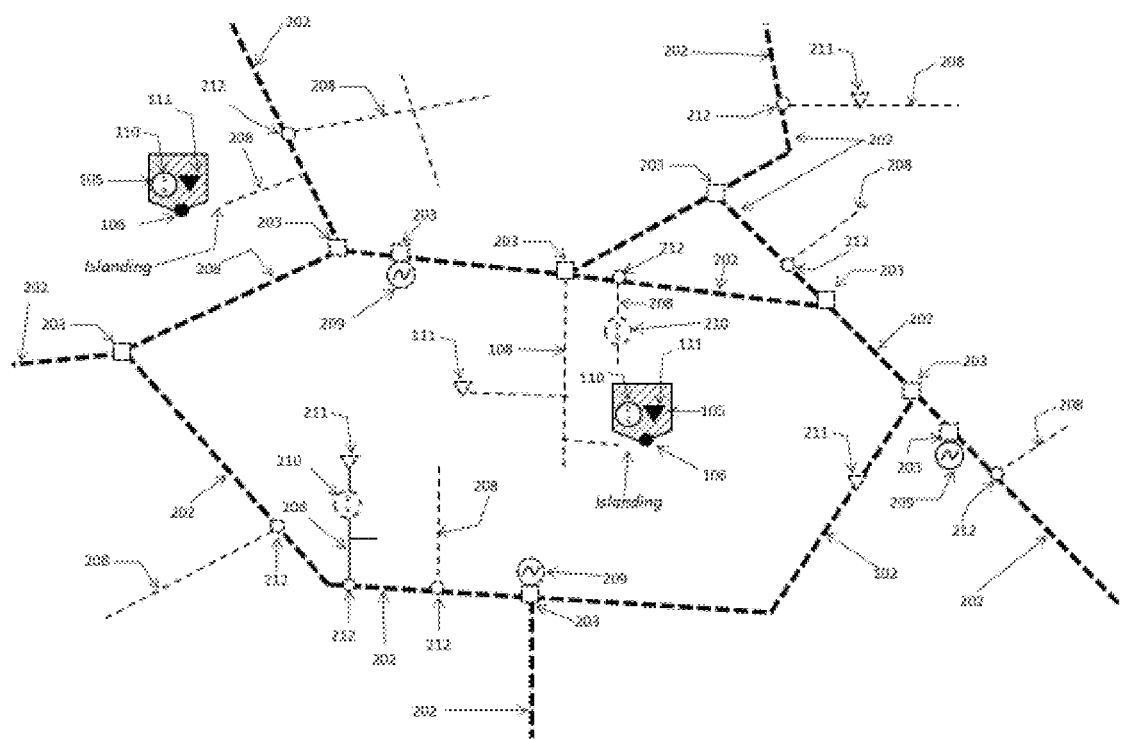
FIG. 6 shows an exemplary embodiment of the regional power grid of FIG. 3 with no enclave, during a widespread regional outage.

FIG. 6 shows a diagram of an embodiment of all the circuits and equipment in the regional electric grid that are offline during a widespread regional outage (e.g., regional outage occurs without an enclave). Nothing operates except, while their available fuel lasts, microgrids which island themselves and emergency generators.

FIGS. 3 and 4 show an electric grid which has two sections: Section A representing an enclave and Section B outside the enclave. FIGS. 5 and 6, by contrast, show the same electric grid, but without an enclave, that is, without the two sections.

FIGS. 3 (with enclave) and 5 (without enclave) show the electric grid operating normally—every generation and storage resource, every transmission and distribution line, and every load can operate, as shown in both of these figures. (Still, relatively brief outages may occur on some lines due to localized conditions, and generation plants sometime have unplanned outages, all which are very normal.) There essentially is no operating difference between FIGS. 3 and 5 (other than that the operators of the enclave are monitoring the electric grid in FIG. 3.)

When a regional outage occurs, however, the situations as shown in FIGS. 4 and 6 are very different from one another and from FIGS. 3 and 5. FIG. 4 shows that, in the electric grid with an enclave, everything in the enclave (i.e., Section A) and microgrids outside the enclave can continue to operate during the outage. In FIG. 6, by contrast, only microgrids are operating as there is no enclave.

The situation in FIG. 6 may actually be even worse than shown if facilities serving the microgrids do not have electricity (e.g., natural gas compressor stations serving microgrid generators.) An enclave such as that shown in FIGS. 3 and 4, by contrast, can be specifically designed to reduce some vulnerabilities due to such interdependencies.

Figure 7:
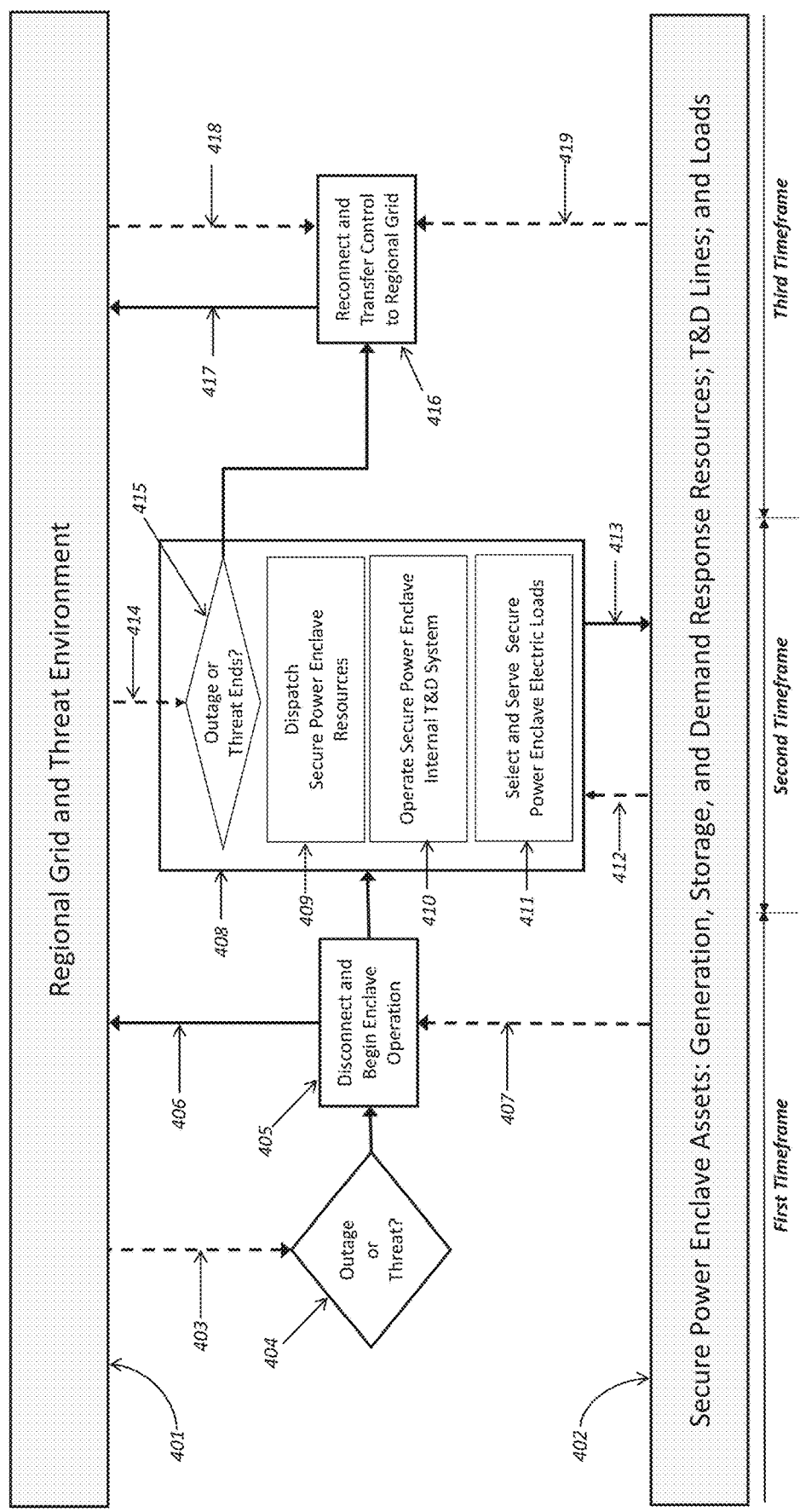
FIG. 7 shows a flow chart of the functionality of a control system according to an exemplary embodiment.

FIG. 7 illustrates the functionality required of the control system. The control system must perform various functions in three timeframes related to the operation of the overall regional grid (401) and the enclave's assets (402). Those assets include the enclave's generation, storage and demand response resources; T&D lines; and loads. Functions performed in the first timeframe, (403) through (407), take place before and during the enclave disconnecting from the regional grid. The second timeframe is the period during which the enclave controls its assets and includes functions (408) through (415). The third timeframe is during and after the enclave reconnecting with the regional grid and includes functions (416) through (419). While some of the decisions made and functions performed may be executed by the control system, some may also be executed by personnel who input directions into the control system.

In the first timeframe, before and during the enclave assuming control of its internal assets from the regional grid, the control system monitors the status of the regional grid and the threat environment it faces (403). A decision is made to disconnect from the regional grid and begin enclave operation when a regional outage or credible and likely threat of a regional outage is detected (404). This decision may be made by the control system and software, or by personnel operating it, depending on the control system design and the circumstances. If a decision is made to disconnect from the regional grid, the process of disconnection and starting enclave operation is initiated by the control system (405). In this process, a signal to disconnect is sent to switchgear at substations on the regional grid (406) and, possibly aided by information gained by already monitoring the status of some or all of the enclave's assets (407), control of those assets is turned over to the enclave control system (408).

In the second timeframe, the control system simultaneously performs and coordinates four functions. It dispatches the resources it controls (409), operates the enclave's internal T&D system (410), and selects and serves the enclave's electric loads (411). This involves balancing resources with loads and maintaining voltage and phase control within the enclave. The control system also continues to monitor the status of the regional grid and the threats it faces (414) so that a decision can be made (415) to restore control to the regional grid.

In the third timeframe, the enclave reconnects with the regional grid (416) and continues to monitor both the regional grid and the enclave's assets. Reconnection involves closing the open switchgear at the substations connecting it to the regional grid, restoring control to the regional grid operator, and resynchronizing with the regional grid (417). Reconnection may be done in coordination with the regional grid operator and some aspects of these functions may be performed by the regional grid operator. The regional grid continues to be monitored (418) to ensure that no need arises to restore independent operation to the enclave, and the enclave's assets also continue to be monitored (419) both to ensure that the reconnection is effective and so that the enclave can reassume control again, if needed.

The normal operation of an electric T&D network performs a function called "sectionalization," which is to disconnect transmission or distribution lines which have a problem (e.g., fault) in order to prevent the impacts of the problem from spreading through the overall T&D network. The problem is then fixed, and the lines are reconnected. By contrast, when the entire T&D network has a problem (such as an outage or cascading failure), the enclave disconnects the rest of the T&D network from the working T&D lines within the enclave in order to prevent the impacts of that problem from spreading throughout the enclave.

During normal grid operation, the enclave can (1) operate measurement equipment to detect regional outages, cascading failures, loss of stability, or other significant problems and a computerized control and communications system monitoring the occurrence of regional outages or cascading failures that could cause such outages in the electric grid, (2) monitor the electric loads that would be served by the enclave and the operational status of generation, T&D, and storage facilities that would serve the enclave, and (3) exercise no control over either those loads or facilities. Also under the normal grid operation, other components of the enclave, including electric power generation and storage, electric transmission and distribution systems, and electric loads, would operate normally and under the control of the systems and entities that usually operate them.

Upon detection of a regional outage, cascading failure or other significant problem or upon command by the enclave's operators (e.g., in anticipation of a major outage), the control system of the enclave sends signals over the enclave's communications system to (1) disconnect the T&D system within the enclave from the rest of the electric grid, (2) take control of those facilities and equipment that it is to operate, and (3) deliver electric power to serve the loads of facilities within the reach of its transmission and distribution system according to priorities set by the operators.

As necessary, in coordination with the operators of the overall regional electric grid, electric facilities controlled by the enclave may be used to black start electric transmission lines and generation resources outside the enclave by transmitting electric power to those facilities. The enclave will operate independently of the rest of the electric grid balancing electric generation, storage, and loads within its system until such time as a decision is reached to restore control to ISO, RTO and/or electric utilities that operate it under normal conditions. Upon such a decision, the control and communications system will then send signals to (1) reconnect to the external T&D system, (2) transfer control of the Enclave, including synchronization and balancing loads, generation and storage, to operators of the broader T&D system, and (3) again, begin to monitor the status of the grid, including regional outages, cascading outages, other problems, the electric loads that would be served by the enclave, and the operational status of generation, T&D, and storage facilities that would serve the enclave.

Multiple enclave configurations are possible, and they could evolve over time. Electric generation, storage, transmission and distribution equipment, and loads could be added or subtracted over time. An enclave also does not have to be built to protect all assets within its footprint from all threats. Indeed, some enclaves could have different levels of threat protection. For example, enclaves could be designed in at least five possible security configurations: (1) Islanding+Cybersecurity (i.e., a "Basic Enclave"), (2) Basic Enclave+Weather Resilience, (3) Basic Enclave+Weather Resilience+Physical Attack, (4) Basic Enclave+Weather Resilience+Physical Attack+Geomagnetic Disturbances, and (5) Basic Enclave+Weather Resilience+Physical Attack+Geomagnetic Disturbances+Electromagnetic Pulse Attacks. Other security configurations may also be implemented. Within each security configuration, there can be multiple options and these options will likely change over time. Enclaves could also be strengthened through the addition of strategically-selected redundancies. Obviously, cost would increase with level of protection and redundancy. One way to control costs would be to phase in different levels of protection over time. Further, not all critical infrastructure assets need to be protected from all threats. Service to different assets could, for example, be protected to different extents based on the relative level of threat to each or on their owner's willingness to pay. Multiple enclaves could also eventually be interconnected to create a web of enclaves that could assist each other during an emergency.

Operation of the enclave can include a secure control processor and system consisting of software and hardware that monitor and operate facilities, devices and measurement equipment with transceivers or other communications devices of the enclave over secure, independent and, to the extent possible, redundant communications systems.

Software for the operation of the enclave can have the functionality to monitor the status of the regional T&D grid through the various measurement equipment, control the various equipment and devices operated as needed by the enclave and determined by the operators or control system, function over the communications system, and island and reconnect the enclave as appropriate. Alternatively, operators of the regional T&D grid could monitor the status of that grid through measurement equipment they operate and send signals and instructions to the enclave operators. Various software and configurations of software can be used for the control of the enclave. Such software could, for example, be adapted from software used to control electric distribution, electric transmission, microgrids, or combinations thereof or independently developed specifically for enclaves.

The communications systems are the glue that holds the enclave together. An enclave may operate over both the electric transmission and distribution systems, and each may be controlled under normal conditions by different entities—one to control electric transmission and others to control distribution. The control and communication systems of each, typically some form of Supervisory Control and Data Acquisition (SCADA) system, are different, in part because they perform different functions. In addition, distribution management and control systems are now changing, in some cases rapidly. Partly, this is to accommodate increasing numbers of distributed energy resources of all types as well as the potential emergence of the Internet of Things. Partly, it is to make use of fast-evolving information, measurement and control technologies such as synchrophasors. Both transmission and distribution control and communications systems are changing to accommodate the emergence of big data and grid analytics applications, both of which could also potentially be used to improve enclave performance. The control and communications system of the enclave may need to operate over both the transmission and distribution networks.

Various communications systems could be used. One example of such a system might be buried optical fiber, possibly following transmission and distribution system rights-of-way. Another example might be a microwave system connecting the facilities to be controlled. Still another example may be a cellular system, particularly with emerging 5G capabilities. Several technologies are available to provide such communications, some wireless, and not all of them digital. Secure operation and communications can be important, and, for that reason, both the control system and the cybersecurity of the enclave can be different from and separated from the external utility and ISO/RTO control and cybersecurity systems. One of the most significant threats facing the power sector today comes from the potential for hacking of power grid control systems. Keeping the enclave's systems separate, different, and confidential can help prevent such cascading.

While the operation of the enclave will need to be coordinated with that of the entire grid, the enclave can have its own control system and cyber-defenses. Both the control system and its cyber-defenses can be independent of and different from that of the overall grid. Redundant control and cybersecurity systems, perhaps even partly manually operated, could also help. Hacking that brings down the overall grid should not have any effect on the enclave's control system. Diversity of systems—and eventually in the long run multiple enclaves, each with its own independent control and cybersecurity systems—would be a major enhancement to the security of the grid.

The control system for the enclave may either be a centralized control system in which enclave is controlled using a single controller or through a distributed control system involving the interaction of the independent control systems of multiple electric sources, circuits and loads in Section 1. A distributed control system may be used to ensure secure controls and/or to enable a transactive energy system. A blockchain system, for example; may be one method that could be used for a distributed control system and/or transactive energy market operation. A blockchain is a decentralized system of information in which a growing list of records, called blocks, are kept on multiple computer systems and linked using cryptography. Many different blockchain systems have been developed and could be used.

It is possible that during a broad regional outage some of the transmission or distribution circuits, served facilities, or communications links within an enclave could become inoperable or have restricted operability. Such a lack of operability could be caused by the same threat that caused the widespread outage or some other impact. Moreover, what is operable and what is not may change over time. In such a situation, methods such as software-defined networks may be used to provide the flexible and secure communications and control required to maintain service.

Enclaves can include a multiplicity of electric substations. Several types of substations may be included in enclaves, including but not necessarily limited to transmission substations, distribution substations, collector substations, and switching substations. Substations may comprise various types of equipment for the specific functions the substation is to carry out. This equipment may include electric buses, transformers, switching equipment, circuit breakers, protection devices, equipment such as capacitors to adjust the phase, control equipment, communications devices, and/or other types of devices. Increasingly substation equipment is being automated and to accomplish this digital control and communications devices are being installed, all of which must be interoperable.

The substations of an enclave may be used for different purposes and the design and configuration of a substation varies accordingly. Substations [103, 112] in FIG. 3 and FIG. 4 may be utilized, for example, to send power to different transmission lines [101, 102, 202], distribution lines [107, 108, 208], and loads [111] at various voltages and on different circuits for three-phase electric power. Power may be transmitted from the one substation [103], through the transmission network [101, 102] or distribution network [107, 108] to a second substation [103], as well as to other substations. Substations may also serve other purposes. A switching substation can operate without changing the voltage level and connect and disconnect various transmission lines within the transmission network [101, 102]. This may be done to carry out the islanding functions of the enclave. Numerous different switching schemes may be incorporated into substations. Many substations can have both transformers and switching equipment.

Wind and solar power as well as some electricity storage technologies also generate direct current electricity. This must usually be converted to alternating current synchronized in frequency and phase with the electric T&D grid using electronic inverters, which may be part of substations. Wind farms and large-scale solar facilities also may connect to the transmission system through collector substations, which add power to the T&D grid from these facilities. As shown in FIGS. 3 and 4, electricity in the various substations is transformed and/or regulated for transmission at high voltage [103] and for local distribution at low voltage [112].

FIG. 8 includes an embodiment of an enclave in that the enclave comprises just one transmission line and one distribution line, although more are possible. This embodiment also comprises four different types of substations and the equipment to monitor the flow of electricity and control the enclave. In particular, a step-up substation with switchgear [301] increases the voltage generated at a central-station power plant [300], in order to increase the voltage to that used by transmission lines within the enclave [304] and outside of the enclave [302]. A large customer load [305], possibly critical infrastructure, is served at the transmission voltage. Measurement equipment with transceivers [303] operate on both the transmission line internal to the enclave [304] and the two transmission lines that connect it to the outside electric grid [302 and 308]. A switching substation [306] contains equipment to vary the flow of electricity between the transmission line further down and internal to the enclave [307] or to an external transmission line [308]. The switching substation does not change the voltage received from the transmission line [304]. Switching equipment in both the step-up substation [301] and the switching substation [306] operate to island the enclave when an outage is detected over the external transmission system.

After the switching substation [306], the current in the enclave transmission line reaches a step-down transformer [309], which reduces the voltage to a lower level where it may be sent on a lower-voltage transmission line (sometimes, depending on the voltage, called a "sub-transmission," line) [310] where medium-size business customers [311] may take electric service. A primary distribution substation on this line [312], decreases the voltage to below 69 kV to transfer electric power to a primary distribution line [313]. Secondary distribution substations and transformers [315] may further reduce the voltage or its phase for use by smaller customer loads, for example, homes [316, 317]. A distribution substation may have a multiplicity of electricity transmission input lines and a multiplicity of electricity distribution output lines at voltages needed by specific customers. In addition, a distribution substation may isolate faults in either the transmission or distribution lines connected to it.

The control processor and transceiver for the enclave [314] are also on the distribution network in this exemplary embodiment although, depending upon their specific power needs, they may alternatively be connected to the transmission grid or there may be a multiplicity of control processors in a distributed control system. One of the homes [317] has solar panels which generate direct current electricity [318] on its rooftop. This direct current electricity is then converted to alternating current at the same frequency and phase as the electric distribution grid using an inverter [319]. After conversion to alternating current, that electricity is used in the home and injected into the electric distribution system, creating a two-way flow of current. Both the utility's control system and that of the enclave need to manage that two-way flow. Under IEEE standard 1547, when the electric grid experiences an outage, some distributed generation sources such as rooftop solar that does not have a smart inverter must not generate electricity for injection into the electric distribution system. One technical benefit of an enclave is that, by keeping the distribution system up and running during a more widespread outage, the enclave can continue to utilize distributed generation sources such as roof-top solar without smart inverters. The distribution circuits to those distributed generation sources, however, do need to be kept connected to the electric distribution lines within the grid during the outage.

Various embodiments of the present disclosure may be implemented using a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution. Some applications such as distributed control, virtual power plants, and some transactive energy systems may require a multiplicity of processors and coupled memory elements.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and computer program products The computer program products may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustration and/or block diagram, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises or carries out one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block in the block diagram, illustration, and combinations of blocks in the block diagrams or flowchart illustration can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

The specific implementations of the invention described and illustrated herein are illustrative and are not intended in any way to limit the scope of the present invention. The design of any enclave will be specific to the section of the actual electric transmission and distribution system in which it is implemented and to the choices made by those who design that enclave and may evolve over time. There may be considerable variation. Such design choices may be affected by and adapted to a wide variety of factors, including manufacturing requirements, applicable standards, changing technology, operating requirements, and other factors without leaving from the claims herein. Many applications, combinations, permutations, and arrangements of the elements that comprise the system described in the claims herein are possible beyond those described in exemplary manner herein.

Many features, details and aspects of the invention may not be described in detail. Further, the connections shown in the figures are meant to represent exemplary physical, information flow, or functional relationships or connections among the various components of the invention. Many alternative or additional physical, information flow, functional relationships or connections may be present in a specific application.

The invention is described herein using specific exemplary embodiments. Modifications and changes may be made without leaving the scope of the present invention as set forth in the claims herein. Specific descriptions and figures are meant to be illustrative, and not restrictive. Many modifications are intended and, indeed, expected to be included within the scope of actual implementations of the present invention. Accordingly, the scope of the invention should be determined by the claims and their legal equivalents rather than by just the examples provided herein.

The steps in any method claims may be carried out in various orders and are not limited to the specific order presented in the claims. Further, the elements in any system claims may be assembled or otherwise operationally configured in many arrangements and are not limited to the specific configuration in the claims.

Any benefits, advantages, or solutions to problems described above with regard to particular embodiments; are not to be construed as critical, required or indispensable features or components of any or all the claims, nor do they limit the benefits, advantages or solutions of the invention.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Although preferred exemplary embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as claimed.

The invention claimed is:

1. A method comprising:
increasing a resilience of a first section of a regional electric transmission grid, that is part of a synchronized interconnection, serving at least two independent electric loads of pre-selected critical infrastructure facilities served by different substations on the regional electric transmission grid by detecting or anticipating a problem in or threats to the regional electric transmission grid, wherein the regional electric transmission grid comprises the first section serving the at least two independent electric loads of the pre-selected critical infrastructure and a second section, wherein the first section and the second section are configured to operate together during normal operating conditions under control of a first control system and a first cybersecurity system for the regional electric transmission grid, wherein neither of the first section or the second section is (a) a microgrid that comprises a group of interconnected loads and distributed energy resources (DER) which is under control independent from the regional electric transmission grid during normal operating conditions, and problem, threat or anticipated problem operating conditions or (b) a system containing only distributed energy resources (DER) which is under control independent from the regional electric transmission grid during normal operating conditions, and problem, threat or anticipated problem operating conditions, wherein the first section is connected to the second section via at least two electric transmission connections which provide for current flow at transmission voltages between the first section and the second section under normal operating conditions, and comprises transmission equipment and at least one of central station power generation equipment or distributed generation equipment capable of serving the at least two independent electric loads within the first section independently of the second section, wherein the second section comprises a remainder of the regional electric transmission grid but excluding the first section;
determining that disconnection of the first section from the second section would enable the first section to continue operation to serve the at least two independent electric loads of the pre-selected critical infrastructure during the problem, anticipated problem or threat, wherein the first section is disconnected from the second section via the at least two electric transmission connections when the problem is detected or anticipated;
controlling an operation of the first section involving movement of power over electric transmission lines after disconnection, during the problem, anticipated problem or threat to balance power generated within the first section with the at least two independent electric loads within the first section, by using a second control system and a second cybersecurity system for the first section that is independent of the first control system and first cybersecurity system;
delivering power to the at least two independent electric loads within the first section;
monitoring, via the second control system, a generation, a transmission, or a distribution of electricity or electric loads within the first section during a period of disconnection;
resynchronizing the first section and the second section of the regional electric transmission grid upon reconnection of the first section and the second section; and
restoring control and operation of the first section to the first control system and the first cybersecurity system when the problem or threat is resolved or no longer anticipated.

2. The method of claim 1, further comprising coordinating one or more of outage detection, disconnection, operation, monitoring, and restoration of the first section with the operation of the second section of the electric interconnection.

3. The method of claim 1, further comprising providing black start capabilities by reenergizing all or a part of the second section of the regional electric transmission grid over at least one of the at least two electric connections between the first section and the second section; and providing motive power to power generation facilities outside of the first section.

4. The method of claim 1, further comprising controlling demand response by various electric loads within the first section.

5. The method of claim 1, further comprising enabling only selected loads to be provided with electricity within the first section.

6. The method of claim 1, further comprising controlling electricity storage within the first section as part of a balancing of electric generation and loads.

7. The method of claim 1, wherein the first section is operated in coordination with an operation of the rest of the electric interconnection when the electric interconnection is operating normally.

8. The method of claim 1, further comprising transmission and distribution of power to a plurality of loads within the first section.

9. The method of claim 1, further comprising monitoring the transmission and distribution of electricity within the first section during the period of disconnection.

10. The method of claim 1, wherein the problem comprises at least one of a widespread outage, a grid stability problem, a cascading failure, extreme natural conditions, or man-made disruptions, or any combination thereof, in or to the regional electric transmission grid.

11. The method of claim 1, wherein the disconnecting is implemented when a widespread outage, grid stability problem, cascading failure, extreme natural conditions, or man-made disruptions, or any combination thereof, is detected or anticipated.

12. The method of claim 1, wherein the electric operation of the first section is restored to the regional electric transmission grid when decided by an operator.

13. The method of claim 12, wherein the operator is an automated computer system or a computerized control system that does not exercise control over the first section during non-problem operation of the regional transmission grid.

14. The method of claim 1, wherein the control of the operation of the first section is accomplished via at least one of a centralized or a distributed control system.

15. A system comprising:
A first section of a regional electric transmission grid that is part of a synchronized interconnection, serving at least two independent electric loads of pre-selected critical infrastructure facilities served by different substations on the regional electric transmission grid, wherein the regional electric transmission grid comprises the first section serving the electric loads of the pre-selected critical infrastructure and a second section, wherein the first section and the second section are configured to operate together during normal operating conditions under control of a first control system and a first cybersecurity system for the regional electric transmission grid, wherein neither of the first section or the second section is (a) a microgrid that comprises a group of interconnected loads and distributed energy resources (DER) which is under control independent from the regional electric transmission grid during normal operating conditions, and problem, threat or anticipated problem operating conditions or (b) a system containing only distributed energy resources (DER) which is under control independent from the regional electric transmission grid during normal operating conditions, and problem, threat or anticipated problem operating conditions, wherein the first section is connected to the second section via at least two electric transmission connections which provide for current flow at transmission voltages between the first section and the second section under normal operating conditions, and comprises transmission equipment and at least one of central station power generation equipment or distributed generation equipment capable of serving the at least two independent electric loads within the first section independently of the second section, wherein the second section comprises a remainder of the regional electric transmission grid but excluding the first section;
at least two electric connections at transmission-level voltages on both sides of a connecting electric substation between the first and second sections, wherein each of the two electric connections contains switching equipment that is configured to isolate the first section from the second section;
a centralized or distributed control system comprising one or more processors that implements instructions either stored in a memory and/or input by an operator to
detect or anticipate a problem in the regional electric transmission grid;
determine that disconnection of the first section from the second section would enable the first section to continue operation to serve the at least two independent electric loads of the pre-selected critical infrastructure during the problem, anticipated problem or threat, wherein the first section is configured for disconnection from the second section via the at least two electric transmission connections when the problem is detected or anticipated;
control operation of the first section independently of the second section after disconnection, during the problem, anticipated problem or threat to balance power generated within the first section with the at least two independent electric loads within the first section, by using a second control system and second cybersecurity system for the first section that is independent of the first control system and first cybersecurity system, wherein the control comprises at least two of power generation, electricity storage, demand response, transmission within the first section, power flow, voltage and frequency control, VAR control, switching, or disconnecting and reconnecting with the regional electric transmission grid via the at least two electric transmission connections,
restoring control and operation of the first section to the first control system and the first cybersecurity system when the problem or threat is resolved or no longer anticipated, and
synchronize the first section in frequency and phase with the regional electric transmission grid via at least one of the at least two electric transmission connections when power is restored to the regional electric transmission grid;
measurement equipment coupled to the control system, wherein the measurement equipment monitors and reports to the second control system a status and operations of at least one of the at least one electric load, power generation, electricity storage, or the electric transmission network, within the first section; and
a plurality of transceivers or other communications devices connecting the second control system to the measurement equipment.

16. The system of claim 15, further including equipment for internal switching within the first section to provide electric current to specific priority electric loads and limit electricity delivered to other specific loads.

17. The system of claim 15, wherein the second cybersecurity system comprises equipment and software to provide cybersecurity to the first section.

18. The system of claim 15, further including equipment to provide protection to selected facilities within the first section from severe weather events, physical attacks, cyber-attacks, geomagnetic disturbances, electromagnetic pulse events, or combinations of these or other threats.

19. The system of claim 15, further including electric storage devices, whether centralized or distributed, located within the first section.

20. The system of claim 15, further including emergency generators located within the first section and measurement and communications equipment to enable coordination with the operations of the first section.

21. The system of claim 15, further including fuel storage facilities for the electric generators within the first section.

22. The system of claim 15, further including one or more microgrids located within the first section and measurement and communications equipment to enable coordination with the operations of the first section.

23. The system of claim 15, further including a communications system comprising a part of a communications system used for control of the electric interconnection, but that is independently operable.

24. The system of claim 15, further including a communications system that serves purposes other than control of the system.

25. The system of claim 15, further comprising distribution lines within the first section, wherein power to loads within the first section are distributed via the distribution lines.

26. The system in claim 15 wherein electric circuits within the first section are controlled using a software defined network.

27. The method of claim 1, wherein the transmission of electricity within the first section during a period of disconnection is monitored via one or more sensors.

28. The method of claim 1, wherein the method is used to control distribution circuits within the first section, including microgrids, distributed generation, distributed storage and electric loads served by the distribution circuits.

29. The method of claim 1, further comprising controlling and operating further selected transmission lines connected to transmission lines already operated by the first section and selected power generation and storage and electric load equipment on the further selected transmission lines, including power generation and storage and electric load equipment on distribution circuits connected to the further selected transmission lines.

30. The method of claim 1, wherein substations and transmission or distribution lines that remain in operation during an outage within or connected to the first section are selected using adaptive islanding methods.

31. The method of claim 1, wherein some or all of the distributed resources that are controlled by the first section are used as a virtual power plant or microgrid and/or to implement a transactive energy system of economic and control mechanisms either within the first section alone or as part of a broader transactive energy market including the first section.

32. The method of claim 1, wherein control and operation of the first section is restored to the regional electric transmission grid after reconnection to the regional electric transmission grid.

33. The system of claim 15, wherein control and operation of the first section is restored to the regional electric transmission grid after reconnection to the regional electric transmission grid.

34. The method of claim 1, further comprising coordinating operation with microgrids or other distributed energy resources (DER) controlled independently from the regional electric transmission grid and interconnected to the first section at points of common coupling.

35. The method of claim 1, further comprising enabling selection of priority loads, transmission and distribution circuits, and electric generation sources within the first section.

36. The method of claim 1, wherein at least one of the first control system and the first cybersecurity system comprise a single system or the second control system and the second cybersecurity system comprise a single system.

37. The system of claim 15, wherein at least one of the first control system and the first cybersecurity system comprise a single system or the second control system and the second cybersecurity system comprise a single system.

38. The method of claim 12, wherein the operator is an automated computer system or a computerized control system that operates at reduced capacity during non-problem operation of the regional transmission grid to avoid detection and access by unauthorized entities.

* * * * *